(12) United States Patent
Le et al.

(10) Patent No.: US 7,716,576 B1
(45) Date of Patent: May 11, 2010

(54) FLEXIBLE XML PARSING BASED ON P-CODE

(75) Inventors: Tin Le, Sunnyvale, CA (US); Krishna Sankar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 646 days.

(21) Appl. No.: 10/152,453

(22) Filed: May 20, 2002

(51) Int. Cl.
*G06F 17/00* (2006.01)

(52) U.S. Cl. .................. 715/237; 715/234; 705/26; 709/238

(58) Field of Classification Search ............. 715/513, 715/763, 234–242; 702/22; 707/3, 10; 709/247, 709/220
See application file for complete search history.

(56) References Cited

U.S. PATENT DOCUMENTS

| 6,418,400 | B1* | 7/2002 | Webber ................. 703/22 |
| 6,785,673 | B1* | 8/2004 | Fernandez et al. ............ 707/3 |
| 7,007,105 | B1* | 2/2006 | Sullivan et al. ............. 709/247 |
| 2002/0038320 | A1* | 3/2002 | Brook .................. 707/513 |
| 2003/0023628 | A1* | 1/2003 | Girardot et al. ............. 707/513 |
| 2003/0046370 | A1* | 3/2003 | Courtney ................ 709/220 |
| 2003/0177443 | A1* | 9/2003 | Schnelle et al. ............. 715/513 |
| 2003/0184585 | A1* | 10/2003 | Lin et al. ................. 345/763 |

* cited by examiner

*Primary Examiner*—Doug Hutton
*Assistant Examiner*—Quoc A Tran
(74) *Attorney, Agent, or Firm*—Stolowitz Ford Cowger LLP

(57) ABSTRACT

Methods and systems thereof for processing Extensible Markup Language (XML) documents are described. In one embodiment, an XML document comprising content in an XML format is parsed. The content is converted into pcodes according to a conversion key; that is, an XML tag is converted into a pcode can be converted back to XML using the conversion key. A pcode file including the parsed XML document, converted into pcode, is thereby generated. The pcode file is smaller than the original XML document and the content is already parsed, so the time needed to process the pcode file is significantly less than the time needed to process an XML document. Memory usage and the time needed to send and receive information are also improved.

19 Claims, 5 Drawing Sheets

FLEXIBLE XML PARSING BASED ON P-CODE

TECHNICAL FIELD

Embodiments of the present invention pertain to information processing. Specifically, embodiments of the present invention pertain to methods and systems for processing documents that are based on Extensible Markup Language.

BACKGROUND ART

The use of Extensible Markup Language (XML) is increasing. As used herein, reference to XML includes variations of XML such as commerce XML (CXML), Rosetta Net XML, electronic publishing XML (EPXML), Ariba XML, and other variations of XML not listed here. Also, reference to XML includes related languages such as Extensible Stylesheet Language (XSL) and its variations.

XML provides a powerful and flexible tool for data exchange. In addition, XML documents are text-readable and hence user-friendly. This combination of powerful features and relative ease of use is a primary reason for the increase in XML usage.

However, XML documents are relatively verbose in their content, and the trend is toward increased verbosity because that makes XML documents even more readable. Consequently, XML documents are relatively large and can take a relatively long time to process (e.g., parse). Problems with memory usage and processing performance are common and well known among developers that work with XML. Larger documents can also take longer to transmit between nodes (e.g., between computer systems in a network).

Various attempts have been made to address these problems. Prior art solutions include the development of improved hardware including faster processors and server systems, and added memory. Software optimizations, such as parsers that use more efficient languages such as C/C++ instead of Java, have been introduced. In addition, different parsing techniques such as Document Object Model (DOM) and Simple API (Application Program Interface) for XML (SAX) have been developed. Compression techniques are typically used to reduce the size of an XML document.

However, each of these attempted solutions has their shortcomings. Hardware and software improvements can result in better performance relative to preceding generations, but these components still have their limits. For example, for a given processor speed, a larger XML document will still take longer to process. In addition, continual upgrades to hardware and software can be costly. DOM might provide some improvements in processing speed but generally does not provide improvements in memory usage because files in the DOM format are generally about the same size as the original XML document. On the other hand, SAX might provide some improvements in memory usage but generally does not increase processing speed. With SAX, only a portion of the XML document is handled at a time; if information from another portion of the document is needed, the document is re-read until the needed information is found. Compression techniques can reduce the time needed to send and receive XML documents; however, processing time on the sending node is consumed in order to compress the document, and on the receiving node in order to decompress the document.

In summary, prior art attempts to reduce memory usage and speed up processing of XML documents, while exhaustive, have their limitations. Accordingly, what is needed is a method or system that can reduce memory usage and speed up the exchange and processing of XML documents beyond the limitations of current hardware and software. The present invention provides a novel solution to these needs.

SUMMARY OF THE INVENTION

In one embodiment, a computer-readable medium is disclosed as having computer-readable program code embodied therein for causing a computer system to perform a method of processing Extensible Markup Language (XML) documents. Said method comprises parsing an XML document comprising content in an XML format. Said method further comprises converting said content into pcodes according to a conversion key, wherein an XML tag is converted into a pcode and wherein said content converted into pcodes can be converted back to XML using said conversion key. Additionally, the method comprises generating a pcode file comprising said XML document parsed and converted into pcode.

Embodiments of the present invention pertain to methods and systems thereof that can reduce memory usage while speeding up the exchange and processing of Extensible Markup Language (XML) documents.

In one embodiment, an XML document comprising content in an XML format is parsed. The content is converted into pcodes according to a conversion key; that is, an XML tag is converted into a pcode. Similarly, a pcode can be converted back to XML using the conversion key. A pcode file including the parsed XML document, converted into pcode, is thereby generated.

In one embodiment, a sequence of multiple XML tags is converted into a pcode; that is, a single pcode can be used to represent a recurring sequence of XML tags.

In one embodiment, the conversion key includes a lookup table (LUT) having a plurality of XML tags, each XML tag having a corresponding pcode. In one such embodiment, when an unrecognized XML tag (e.g., a tag not in the LUT) is read, a new pcode can be generated for the unrecognized XML tag and added to the LUT. In another such embodiment, when an unrecognized XML tag is read, the tag is included in the pcode file without being converted to pcode. In one embodiment, the unrecognized XML tag is marked in the pcode file with a specialized pcode that demarcates the XML tag in the pcode file.

According to embodiments of the present invention, the pcode file can be forwarded to another node. The conversion key may exist already on the other node, or the conversion key can be forwarded to the other node with the pcode file. An advantage of pcode is that it is transportable across different operating systems and platforms.

The pcode file is smaller than the original XML document, and as such the pcode file can be more quickly exchanged between nodes. In one embodiment, the pcode file is compressed to further reduce its size.

The pcode file can be processed without converting the pcode file back to XML. The software and processing functions generally used with XML documents can also be applied to pcode files. Because the pcode file is already parsed, and by virtue of its smaller size as mentioned above, it is anticipated that the time needed to send/receive a pcode file and to process it will be substantially less than the time needed to process an XML document. These and other objects and advantages of the present invention will be recognized by those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
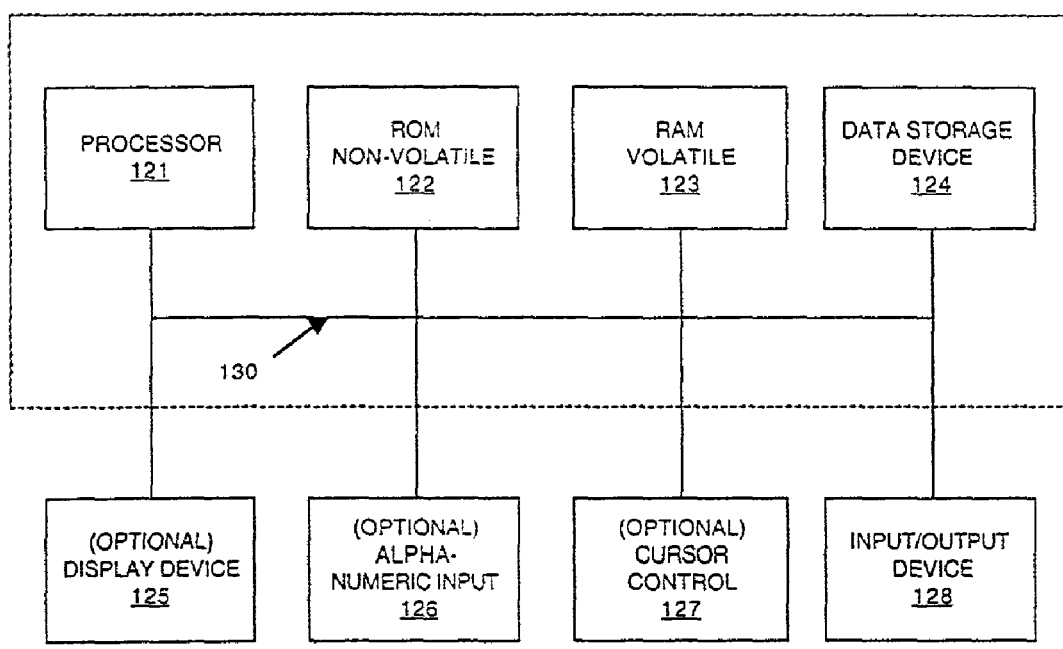
FIG. 1 is a block diagram of an exemplary computer system upon which embodiments of the present invention may be practiced.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "parsing" or "converting" or "generating" or "reading" or "adding" or "including" or "marking" or "forwarding" or "compressing" or "processing" or "receiving" or "performing" or the like, refer to the action and processes of a computer system (e.g., flowchart 300 of FIG. 3), or similar electronic computing device, that manipulates and transforms data represented as physical (electronic) quantities within the computer system's registers and memories into other data similarly represented as physical quantities within the computer system memories or registers or other such information storage, transmission or display devices.

As used herein, reference to XML includes variations of XML such as commerce XML (CXML), Rosetta Net XML, electronic publishing XML (EPXML), Ariba XML, and other variations of XML not listed here. Also, reference to XML includes related languages such as Extensible Stylesheet Language (XSL) and its variations. Generally speaking, aspects of the present invention may be used with parsable computer languages exemplified by XML and XSL.

FIG. 1 illustrates an exemplary computer system 120 upon which embodiments of the present invention may be practiced. In its various implementations, computer system 120 may not include all of the elements illustrated by FIG. 1, or computer system 120 may include other elements not described by FIG. 1.

In general, computer system 120 comprises bus 130 for communicating information, processor 121 coupled with bus 130 for processing information and instructions, RAM 123 coupled with bus 130 for storing information and instructions for processor 121, ROM 122 coupled with bus 130 for storing static information and instructions for processor 121, data storage device 124 such as a magnetic or optical disk and disk drive coupled with bus 130 for storing information and instructions, an optional user output device such as display device 125 coupled to bus 130 for displaying information to the computer user, an optional user input device such as alphanumeric input device 126 including alphanumeric and function keys coupled to bus 130 for communicating information and command selections to processor 121, and an optional user input device such as cursor control device 127 coupled to bus 130 for communicating user input information and command selections to processor 121. Furthermore, input/output (I/O) device 128 is used to communicatively couple computer system 120 to another device. I/O device 128 may be a device used for wired communication or for wireless communication.

Figure 2A:
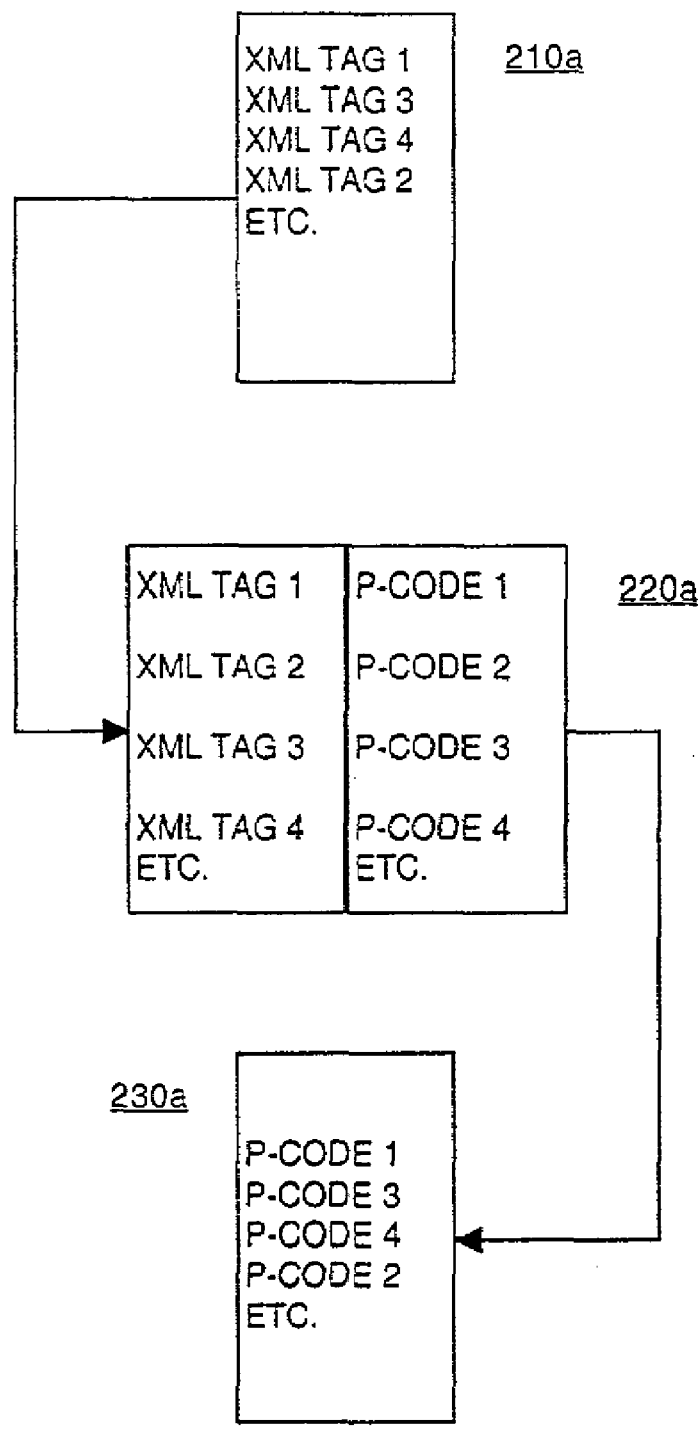
FIGS. 2A, 2B and 2C illustrate the conversion of an XML document into p-code according to embodiments of the present invention.
Figure 2B:
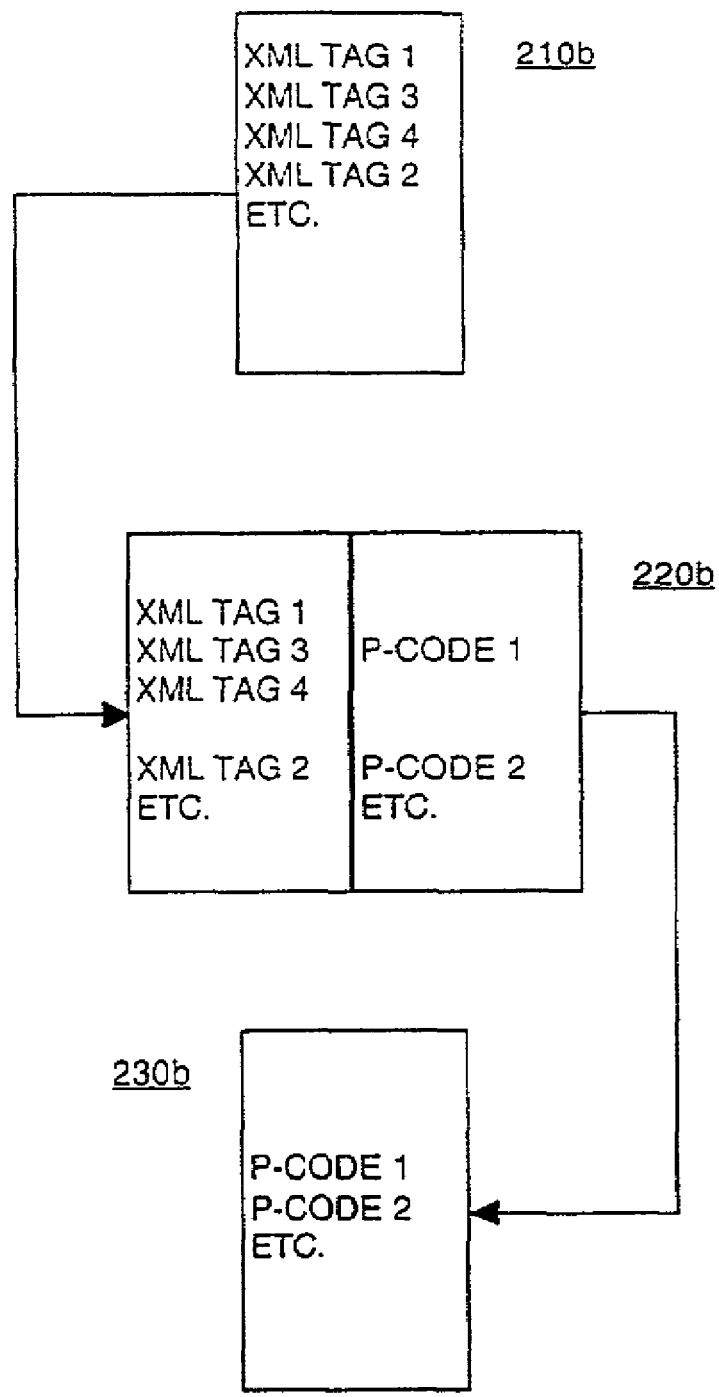
Figure 2C:
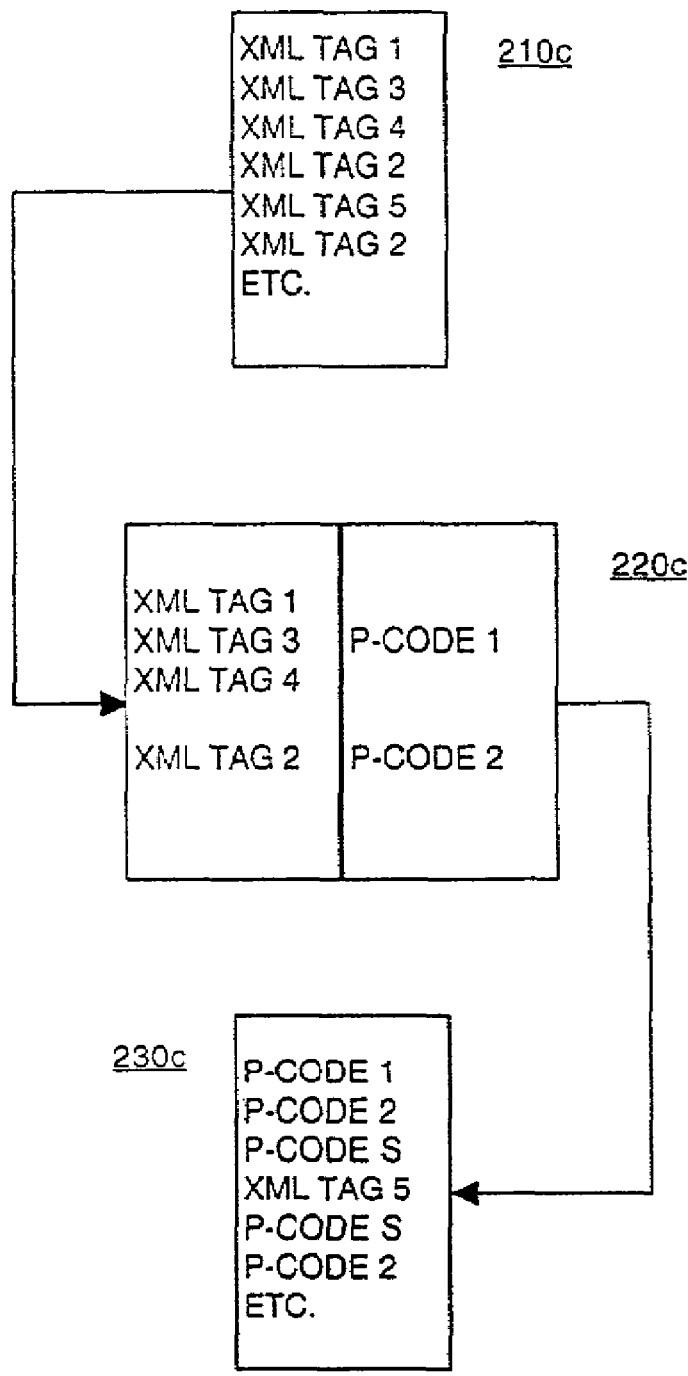

FIGS. 2A, 2B and 2C illustrate the conversion of an XML document into pcode according to embodiments of the present invention. In one embodiment, the conversion of an XML document into pcode is implemented on a node (e.g., a server in a network) such as that exemplified by computer system 120 of FIG. 1. It is appreciated that an XML document can be converted into pcode at various other types of nodes including routers, switches and the like.

Referring first to FIG. 2A, in the present embodiment, XML document 210a includes a number of XML tags represented as XML tags 1, 2, 3, 4, etc. According to the embodiments of the present invention, XML document 210a is read and parsed. As a result of the reading and parsing, XML document 210a is output as pcode file 230a. In the present embodiment, pcode file 230a includes a number of pcodes represented as pcodes 1, 2, 3, 4, etc.

In the present embodiment, XML tags 1, 2, 3, 4, etc. are converted to pcodes using a conversion key 220a. In one embodiment, conversion key 220a is a lookup table (LUT) that includes, for each XML tag 1, 2, 3, 4, etc., a corresponding pcode 1, 2, 3, 4, etc. In this embodiment, XML document 210a is read and parsed. Using conversion key 220a, a pcode (e.g., pcode 1) is found for XML tag 1, a pcode (e.g., pcode 2) is found for XML tag 2, and so on. These pcodes are then saved in pcode file 230a.

Pcode is compact relative to XML. As a result, the size of pcode file 230a is smaller relative to XML document 210a. In general, it is anticipated that a pcode file will be about one-fourth as large as an XML document. With optimizations, it is anticipated that file sizes may be reduced by an order of magnitude. Thus, according to the embodiments of the present invention, memory usage will be reduced. In addition, because of the smaller file size, the time needed to send and receive files (e.g., between nodes over a network) will also be reduced.

Furthermore, because the XML document is parsed during the generation of the pcode file, the content of the pcode file does not require parsing, thereby speeding up processing time. In essence, a portion of the processing (specifically, the parsing) can be completed in advance, during the generation of the pcode file. Hence, the parsing does not need to be subsequently repeated, saving processing time. The pre-parsed pcode file can be forwarded from node to node, as desired, improving efficiency not only because the pcode file is reduced in size, but also because receiving nodes do not need to parse the content.

The software and processing functions generally used with XML documents can also be applied to pcode files; thus, it is not necessary to convert the pcode file back to XML for processing. However, note that conversion key 220a can be used to convert a pcode back into an XML tag, if so desired.

In summary, there is no significant detriment to converting an XML document to pcode and many benefits, resulting in a net positive effect on memory usage, processing time, and the time needed to send and receive documents and files.

Referring next to FIG. 2B, an optimization of the approach of FIG. 2A is described. It is recognized that some XML tags may occur in a particular order on a recurrent basis. For example, in the present embodiment, XML document 210b includes a recurring sequence of XML tags 1, 3 and 4. When this occurs, the recurring sequence of XML tags can be represented by a single pcode. For example, the sequence of XML tags 1, 3 and 4 is represented by pcode 1 in conversion key 220b. Accordingly, the size of pcode file 230b is reduced relative to a pcode file that is generated without the optimization of the present embodiment. In other words, pcode file 230b is expected to be smaller than pcode file 230a of FIG. 2A, for example.

It is appreciated that other optimizations known in the art may be used in accordance with the present invention. That is, those knowledgeable in the use of pcode are aware of optimizations that have been developed for other applications. Many of these other optimizations may also be applied to the conversion of XML documents into pcode.

FIG. 2C illustrates an embodiment in which an XML tag (e.g., XML tag 5) is not found in conversion key 220c. In the present embodiment, a specialized pcode S is used to indicate that XML tag 5 is an unrecognized tag (that is, an XML tag that is not found in conversion key 220c). In this embodiment, XML tag 5 is bracketed by the pcodes S and placed, without conversion to pcode, into pcode file 230c. The pcodes S are used to demarcate XML tag 5 in pcode file 230c. Accordingly, the processing functions can recognize XML tag 5 as an XML tag and not as a pcode and can process XML tag 5 accordingly. It is recognized that it is not necessary to convert the pcodes in pcode file 230c to XML in order to process a file having a combination of pcodes and XML tags.

It is appreciated that, in other embodiments, an unrecognized XML tag can be handled differently. For example, unrecognized tags could be immediately flagged to a user/programmer, who can then add a pcode for the unrecognized XML tag to the conversion key. Alternatively, a pcode could be generated automatically when an unrecognized XML tag is found. In general, it is contemplated that new pcodes can be added to the conversion key as needed. When a new pcode is added to the conversion key, the revised conversion key can be forwarded to another node along with the pcode file. The revised conversion key can also be disseminated to other nodes in advance of the pcode file.

Figure 3:
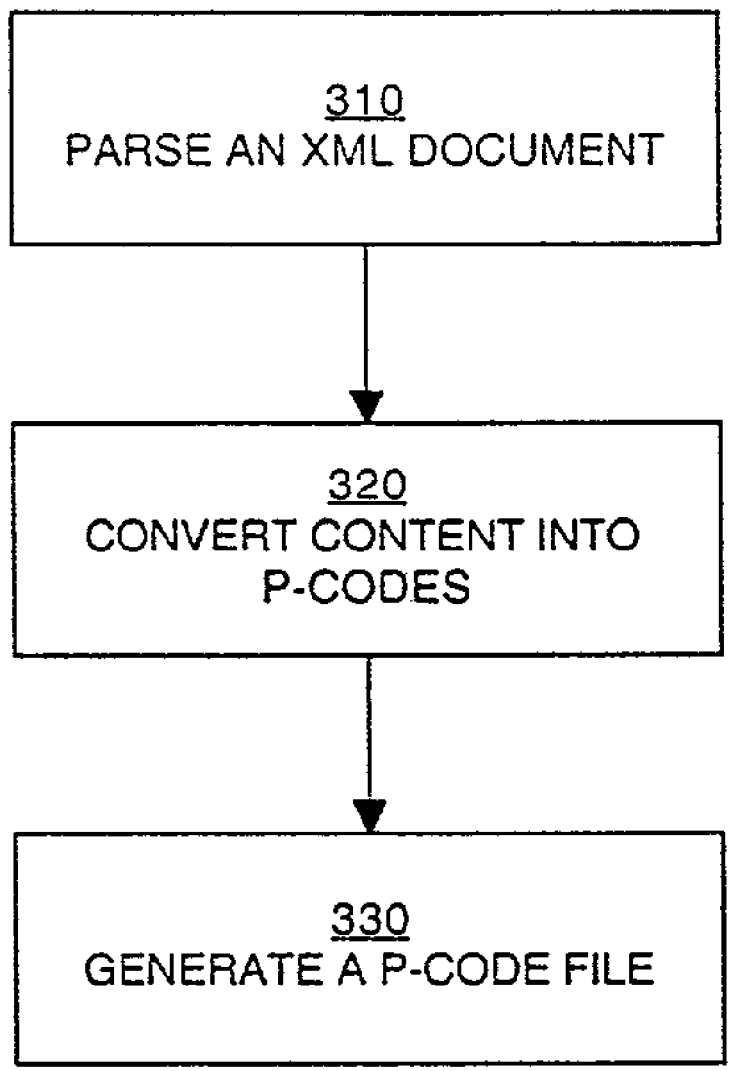
FIG. 3 is a flowchart of a method for processing XML documents according to one embodiment of the present invention.

FIG. 3 is a flowchart 300 of a method for processing XML documents according to one embodiment of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed.

In step 310, in the present embodiment, an XML document comprising content in an XML format is parsed. In step 320, in the present embodiment, the content of the XML document is converted into pcodes. In one embodiment, the conversion is accomplished using a conversion key; that is, an XML tag is converted into a pcode using the conversion key.

In one embodiment, the conversion key includes an LUT having a plurality of XML tags, each XML tag having a corresponding pcode. In one such embodiment, when an unrecognized XML tag (e.g., a tag not in the LUT) is read, a new pcode can be generated for the unrecognized XML tag and added to the LUT. In another such embodiment, when an unrecognized XML tag is read, the tag is included in the pcode file without being converted to pcode. In one embodiment, the unrecognized XML tag is marked in the pcode file with a specialized pcode that demarcates the XML tag in the pcode file.

It is appreciated that steps 310 and 320 can be performed in an order in which the XML document is parsed and then converted to pcode, or in which the XML document is converted to pcode and the pcode is then parsed. It is also appreciated that steps 310 and 320 can be performed together. That is, the XML document can be parsed and, as part of the parsing, converted to pcode. In essence, in the latter case, the XML document is parsed and "compiled" as pcode. Generally speaking, the embodiments of the present invention provide, as an output, a pcode file that includes an XML document that has been parsed and converted into pcode (step 330).

According to embodiments of the present invention, the pcode file can be forwarded to another node. The conversion key may exist already on the other node, or the conversion key can be forwarded to the other node with the pcode file. It is contemplated that a standardized conversion key can be developed and disseminated through an organization such as the World Wide Web Consortium (W3C).

The pcode file is smaller than the original XML document, and as such the pcode file can be more quickly exchanged between nodes. In one embodiment, the pcode file is compressed to further reduce its size.

Thus, embodiments of the present invention provide methods and systems thereof that can reduce memory usage while speeding up the processing and exchange of XML documents. It is contemplated that hardware components optimized for converting XML into pcode (and back again) can be designed, moving some portion of the conversion process from software into hardware. Hardware components optimized for converting XML into pcode and back can be incorporated into nodes (e.g., routers, switches, servers and the like) that reside on a network, for example.

The preferred embodiment of the present invention is thus described. While the present invention has been described in particular embodiments, it should be appreciated that the present invention should not be construed as limited by such embodiments, but rather construed according to the below claims.

What is claimed is:

1. A method of processing Extensible Markup Language (XML) documents, said method comprising:
 parsing an XML document comprising content in an XML format;
 converting said content into pcodes according to a conversion key, wherein said conversion key comprises a lookup table (LUT) comprising a plurality of XML tags, said XML tags each having a corresponding pcode, wherein an XML tag is converted into a pcode according to said conversion key and wherein said content converted into pcodes is convertible back to XML using said conversion key;
 representing a recurring sequence of different XML source code segments comprising multiple XML tags as a single same pcode, wherein said LUT further comprises an entry comprising said recurring sequence and said single pcode;
 generating a pcode file comprising said XML document parsed and converted into pcode, wherein said pcode file comprises said single pcode in lieu of each occurrence of said recurring sequence of XML tags; and
 forwarding said conversion key with said pcode file from one computer system to another computer system.

2. The method of claim 1, further comprising:
 reading an unrecognized XML tag, wherein an unrecognized XML tag is an XML tag not in said LUT;
 generating a new pcode for said unrecognized XML tag; and
 adding said new pcode and said unrecognized XML tag to said LUT.

3. The method of claim 1, further comprising:
 reading an unrecognized XML tag, wherein an unrecognized XML tag is an XML tag not in said LUT; and
 including said unrecognized XML tag in said pcode file, wherein said unrecognized XML tag is not converted into a pcode.

4. The method of claim 3, further comprising:
 marking said unrecognized XML tag with a specialized pcode, wherein said specialized pcode demarcates said unrecognized XML tag in said pcode file.

5. The method of claim 1, further comprising compressing said pcode file.

6. The method of claim 1, further comprising processing said pcode file without converting said pcode file back to XML.

7. The method of claim 1, wherein said single same pcode comprises three or more XML tags.

8. A method of processing documents based on an Extensible Markup Language (XML), said method comprising:
 receiving a file comprising a combination of a plurality of pcodes and an XML tag, wherein said pcodes represent an XML document that has been parsed and converted into pcodes according to a conversion key, wherein said conversion key comprises a lookup table (LUT) comprising pcodes and corresponding XML tags, wherein said pcodes represent XML tags in said XML document and wherein said pcodes are convertible back to said XML tags using said conversion key;
 identifying a single same pcode representing a recurring sequence of different XML segments comprising multiple XML tags, wherein said LUT further comprises an entry comprising said recurring sequence and said single pcode; and
 processing said single pcode as if it contained said multiple XML tags.

9. The method of claim 8 wherein said processing further comprises:
 converting said pcodes into said XML tags using said conversion key; and performing actions according to said XML tags.

10. The method of claim 8 wherein said processing further comprises:
 performing actions according to said pcodes without converting said pcodes into said XML tags.

11. The method of claim 8, wherein said LUT further comprises separate entries for the multiple XML tags, each of the multiple XML tags associated with a corresponding pcode that is different than the single pcode.

12. A device comprising:
 a memory unit; and
 a processor coupled to said memory unit, said processor for executing a method of processing Extensible Markup Language (XML) documents, said method comprising:
  parsing an XML document comprising content in an XML format;
  converting said content into pcodes according to a conversion key, wherein said conversion key comprises a lookup table (LUT) comprising a plurality of XML tags, said XML tags each having a corresponding pcode, wherein said content converted into pcodes is convertible back to XML using said conversion key;
  finding in said content an unrecognized XML tag that cannot be converted into a pcode using said conversion key, wherein an unrecognized XML tag is an XML tag not in said LUT;
  generating a new pcode for said unrecognized XML tag, wherein said new pcode comprises a specialized pcode designated an unrecognized XML tag followed by said unrecognized XML tag;
  adding said new pcode to said LUT; and
  forwarding said LUT from said device to another device located at different nodes of a network.

13. The device of claim 12, wherein said method further comprises:
 representing a recurring sequence of different XML source code segments comprising multiple XML tags converted into as a single same pcode, wherein said LUT further comprises an entry comprising said recurring sequence and said single pcode.

14. A computer-usable medium having computer-readable program code embodied therein for causing a computer system to perform a method of processing Extensible Markup Language (XML) documents, said method comprising:
 parsing an XML document comprising content in an XML format comprising multiple XML tags;
 converting said XML tags into pcodes according to a conversion key, wherein said conversion key comprises a lookup table (LUT) comprising a plurality of XML tags;
 representing a recurring sequence of different XML segments comprising multiple XML tags as a single same pcode, wherein said LUT further comprises an entry comprising said recurring sequence and said single same pcode, wherein said XML tags converted into pcodes are convertible back to said XML tags using said conversion key;
 generating a pcode file comprising a combination of said pcodes and said XML tags; and
 forwarding said pcode file from said computer system to another computer system.

15. The computer-usable medium of claim 14 wherein the single same pcode includes three or more XML tags.

16. The computer-usable medium of claim 14, wherein said computer-readable program code embodied therein causes said computer system to perform said method comprising:

reading an unrecognized XML tag, wherein said unrecognized XML tag is an XML tag not in said LUT;

generating a new pcode for said unrecognized XML tag, wherein said new pcode comprises a specialized pcode designated an unrecognized tag followed by said unrecognized XML tag; and adding said new pcode to said LUT.

17. A system for executing a method of processing Extensible Markup Language (XML) documents, said system comprising:

means for parsing an XML document comprising content in an XML format;

means for converting said content into pcodes according to a conversion key, wherein said conversion key comprises a lookup table (LUT) comprising a plurality of XML tags, said XML tags each having a corresponding pcode, wherein an XML tag is converted into a pcode according to said conversion key and wherein said content converted into pcodes is convertible back to XML using said conversion key;

means for identifying a recurring sequence comprising more than two XML tags, wherein said recurring sequence of XML tags is represented using a single same pcode;

means for generating a pcode file comprising said XML document parsed and converted into pcode, wherein said pcode file comprises said single pcode in lieu of each occurrence of said recurring sequence of XML tags; and means for forwarding said conversion key with said mode file from one computer system to another computer system located at different nodes of a network.

18. The system of claim 17, further comprising:

means for reading an unrecognized XML tag, wherein an unrecognized XML tag is an XML tag not in said LUT;

means for generating a new pcode for said unrecognized XML tag wherein said new pcode comprises a specialized pcode designating an unrecognized tag followed by said unrecognized XML tag; and means for adding said new pcode to said LUT.

19. The system of claim 17, further comprising:

means for reading an unrecognized XML tag, wherein an unrecognized XML tag is an XML tag not in said LUT; and including said unrecognized XML tag in said pcode file, wherein said unrecognized XML tag is not converted into a pcode.

* * * * *

UNITED STATES PATENT AND TRADEMARK OFFICE
CERTIFICATE OF CORRECTION

| | | |
|---|---|---|
| PATENT NO. | : 7,716,576 B1 | Page 1 of 1 |
| APPLICATION NO. | : 10/152453 | |
| DATED | : May 11, 2010 | |
| INVENTOR(S) | : Tin Le | |

It is certified that error appears in the above-identified patent and that said Letters Patent is hereby corrected as shown below:

On column 8, line 1, CLAIM 9, after "of" delete "claim 8" and insert -- claim 8, --.

On column 8, line 6, CLAIM 10, after "of" delete "claim 8" and insert -- claim 8, --.

On column 8, line 13, CLAIM 11, after "than" delete "the" and insert -- said --.

On column 8, line 66, CLAIM 15, after "of" delete "claim 14" and insert -- claim 14, --.

On column 8, line 66, CLAIM 15, after "wherein" delete "the" and insert -- said --.

On column 10, line 9, CLAIM 17, after "said" delete "mode" and insert -- pcode --.

Signed and Sealed this
Twenty-fourth Day of April, 2012

David J. Kappos
*Director of the United States Patent and Trademark Office*